(12) United States Patent
Thomas et al.

(10) Patent No.: US 6,335,679 B1
(45) Date of Patent: Jan. 1, 2002

(54) VEHICLE ALARM AND PAGER SYSTEM

(76) Inventors: Keith A. Thomas, 1509 W. 20th Park Pl.; Timothy A. Kearnes, 951 Whildin, both of Emporia, KS (US) 66801; Bruce R. Davis, 519 W. Lincoln, Madison, KS (US) 66860

( * ) Notice: Subject to any disclaimer, the term of this patent is extended or adjusted under 35 U.S.C. 154(b) by 0 days.

(21) Appl. No.: 09/252,565

(22) Filed: Feb. 18, 1999

Related U.S. Application Data

(63) Continuation-in-part of application No. 09/121,231, filed on Jul. 23, 1998.

(51) Int. Cl.[7] .............................................. B60R 25/10
(52) U.S. Cl. ..................................................... 340/426
(58) Field of Search ................................ 340/426, 436, 340/539, 825.69, 825.44, 825.72; 342/457

(56) References Cited

U.S. PATENT DOCUMENTS

| | | | | |
|---|---|---|---|---|
| 4,794,368 A | * | 12/1988 | Grossheim et al. | 340/539 |
| 5,117,217 A | | 5/1992 | Nykerk | 340/426 |
| 5,216,407 A | | 6/1993 | Hwang | 340/426 |
| 5,473,305 A | | 12/1995 | Hwang | 340/426 |
| 5,543,776 A | | 8/1996 | L'Esperance et al. | 340/426 |
| 5,677,664 A | | 10/1997 | Sawinski | 340/426 |
| 5,739,747 A | | 4/1998 | Flick | 340/426 |
| 5,870,020 A | | 2/1999 | Harrison, Jr. | 340/426 |
| 6,028,505 A | * | 2/2000 | Drori | 340/426 |
| 6,028,506 A | * | 2/2000 | Xiao | 340/426 |

\* cited by examiner

Primary Examiner—Brent A. Swarthout
(74) Attorney, Agent, or Firm—Shook, Hardy & Bacon LLP

(57) ABSTRACT

A vehicle alarm system (20) includes an alert transmitter (32), alert receiver (44), alert device (46), arming unit (42), alarm unit (28), and alarm device (30). The alert transmitter (32), alert receiver (44), and alert device (46) are added to the arming unit (42), alarm unit (28), and alarm device (30) of an existing vehicle alarm system to notify a vehicle owner that an alarm condition has occurred when the vehicle owner is beyond audible range of the alarm device (30). An arming unit power source (52) and arming unit controls (54,56) are used to power and control the alert receiver (44) and alert device (46), and the arming unit (42) is coupled with an alert housing (50) to provide a unitary remote assembly (24). A pager unit (72) is provided in the vehicle passenger compartment and transmits a pager signal to the alarm unit (28B). When used with the pager unit (72), the alert receiver (44) is replaced with a transceiver (74) which operates to send an acknowledgment signal (80) back to the pager unit (72) to deactivate a pager indicator light (76). The alert transmitter (32B) is operable to send an encoded wireless signal (40B) to the alert transceiver (74) to inform the vehicle owner of the nature of the alarm condition that has occurred.

14 Claims, 3 Drawing Sheets

VEHICLE ALARM AND PAGER SYSTEM

PRIOR APPLICATIONS

This application is a continuation-in-part of and claims priority on previously filed and copending U.S. patent application filed Jul. 23, 1998, and having application Ser. No. 09/121,231.

BACKGROUND OF THE INVENTION

1. Field of the Invention

This invention relates to vehicle alarm systems and, more particularly, components added to a currently installed vehicle alarm system. In preferred forms, a self-contained signaling transmitter is attached to the current security device installed in the vehicle and an RF receiver is attached to the current remote arming unit to notify a vehicle owner that the vehicle alarm system has been activated. Preferably, the transmitter sends an encoded signal to inform the vehicle owner of the nature of the alarm condition activating the alarm system.

This invention further relates to pager systems and, more particularly, to pager systems used in combination with vehicles and vehicle alarm systems. In preferred forms, a pager unit is provided in the vehicle to notify a remote individual that the pager unit has been activated.

2. Description of Prior Art

With automobile thefts, break-ins, and vandalism all on the rise, increasing numbers of motorists are utilizing vehicle alarm systems to protect their vehicles. To encourage their use, some automobile insurance companies offer discounts on automobile insurance when vehicle alarm systems are installed.

A typical vehicle alarm system, illustrated in prior art FIG. 1, typically consists of an alarm unit and a remote arming unit. The alarm unit is mounted in the vehicle and powered by the vehicle battery. The alarm unit is operatively connected with a siren or the vehicle's horn, so that when an intruder is detected, the siren sounds an alarm. Typically, the siren is also powered by the vehicle battery, and the siren requires a significant amount of power from the vehicle battery. The remote arming unit has its own power source and a pair of buttons which operate to selectively activate and deactivate the alarm unit.

These conventional vehicle alarm systems perform their intended function of scaring away intruders a majority of the time. However, there are occasions when the vehicle is left in remote locations where no one is around to hear the alarm leaving the intruder free to continue illegal activity, and even if the intruder flees, the alarm continues to sound unheard perhaps for many hours. In this situation the alarm may not perform its intended function of scaring the intruder away, and because of the power consumed by the siren, the owner may return to the vehicle only to find that it will not start because the siren has depleted the vehicle battery's power.

Occasionally, vehicle alarm systems are inadvertently activated, and unless the owner is able to hear the alarm and deactivates it, the alarm will continue to sound. This situation is extremely annoying to anyone around the vehicle and again, can result in depleting the vehicle battery's power. Further, when an alarm is sounding in a parking lot full of vehicles, it is difficult for owners to discern whether or not it is their vehicle that is responsible. The responsible owner may continue with planned activities assuming that it is someone else's vehicle. Again, surrounding people are annoyed and there is a risk that the vehicle battery will run down.

Some systems also provide a transmitter in the vehicle and a remote pager carried by the vehicle owner. The transmitter sends a signal to the pager to notify the owner that the vehicle alarm has been activated. This arrangement is inconvenient because the vehicle owner must carry a separate arming unit and pager. Further, to upgrade existing vehicle alarm systems to include a remote signaling feature requires the installation of an entirely new paging unit that interfaces with the current main unit. Because of the cost of such upgrade, vehicle owners are discouraged from using a remote signaling feature if they already have a vehicle alarm system.

Further, current systems do not provide a way for individuals in the vehicle to send a signal to the remote pager without setting off the alarm. This inability encourages several unsafe and otherwise undesirable conditions to exist. For example, when picking up children from school or other activities, the children typically wait outside until the parents arrive to collect them. Thus, the children are exposed to bad weather and have an increased risk of abduction because they are waiting outside.

Another unsafe situation is created when an individual rushes back to the vehicle after the alarm is activated. Surprising an intruder inside the vehicle can lead to a violent confrontation. Current vehicle alarm system are incapable of informing the responsible person of the nature of the activity that has triggered the alarm. Thus, the responsible person cannot make an informed decision about the appropriate action to be taken, i.e., return or call the police.

SUMMARY OF THE INVENTION

The present invention solves the problems mentioned above and provides a distinct advance in the state of the art. In particular, the invention is directed to a vehicle alarm system with an alert transmitter, alert receiver, and alert device which can be installed in a vehicle as an original alarm system or added to an existing vehicle alarm system. Upon occurrence of an alarm condition, the alert transmitter sends a signal to the alert receiver which in turn sends a signal to the alert device. When the signal is received by the alert device, the alert device operates to notify the responsible party of the alarm condition.

A preferred vehicle alarm system includes an arming unit with arming unit controls, an alarm unit, and an alarm device such as the vehicle horn. The alert transmitter is connected to the alarm unit to receive an alarm signal from the alarm unit, and when the alarm signal is received, the alert transmitter sends a 900 MHZ, wireless alert signal to the alert receiver which is preferably powered by an arming unit power source. The alert device, which is also powered by the arming unit power source, receives an alert activation signal from the alert receiver and either beeps or vibrates. The alert receiver and alert device are held in a wireless and portable alert housing, and the alert device is controlled by the arming unit controls. Alternatively, the alert components have their own alert power source and alert controls.

The invention is further directed to a method for modifying an existing vehicle alarm system to include an alarm condition remote notification feature. The method includes installing the alert transmitter in the vehicle, and coupling the arming unit with the alert housing.

A preferred method includes connecting the alert receiver and alert device to the arming unit power source and arming unit controls, so that the alert receiver and alert device are powered and controlled thereby. The arming unit is inserted into the alert housing, so that the arming unit controls are accessible for use. The alert transmitter is operatively connected to the alarm unit to receive the alarm signal from the alarm unit.

The invention is further directed to a pager system for notifying remote individuals. The page system includes a pager unit operable to transmit a pager signal. Upon sending the pager signal, a remote alert receiver for accompanying the remote individuals receives a wireless alert signal. The remote alert receiver sends an alert activation signal to an alert device which is operable to notify the remote individuals. When used in the situation described above, the signal is sent from the vehicle to a remote pager carried by the children allowing the children to safely wait inside out of inclement weather until the parents actually arrive.

In a preferred embodiment, the remote alert receiver comprises a remote alert transceiver which sends a wireless acknowledgment signal whereby the pager unit is informed that the remote alert signal was received. The pager unit includes a pager activation indicator, preferably a light, which turns on when the pager signal is transmitted. To inform the parents in the vehicle that their children have received the alert signal, the pager activation indicator is turned off when the acknowledgment signal is transmitted by the remote alert transceiver. In preferred forms the pager unit is used in combination with a vehicle and a vehicle alarm system.

The invention is still further directed to an alert transmitter which sends an encoded wireless signal. The encoded signal includes a selective one of a plurality of codes corresponding to different types of alarm conditions. In a preferred embodiment, each code represents a different type of alarm condition such as outer body contact, entry, and vehicle started. The alarm unit senses the type of alarm condition and transmits a coded alarm signal to the alert transmitter. When the remote alert receiver, preferably a pager with a display, receives the encoded signal from the alert transmitter, it displays the type of alarm condition, so that the responsible individual can device whether to return to the vehicle or call the police.

DETAILED DESCRIPTION OF THE PREFERRED EMBODIMENTS

Figure 2:
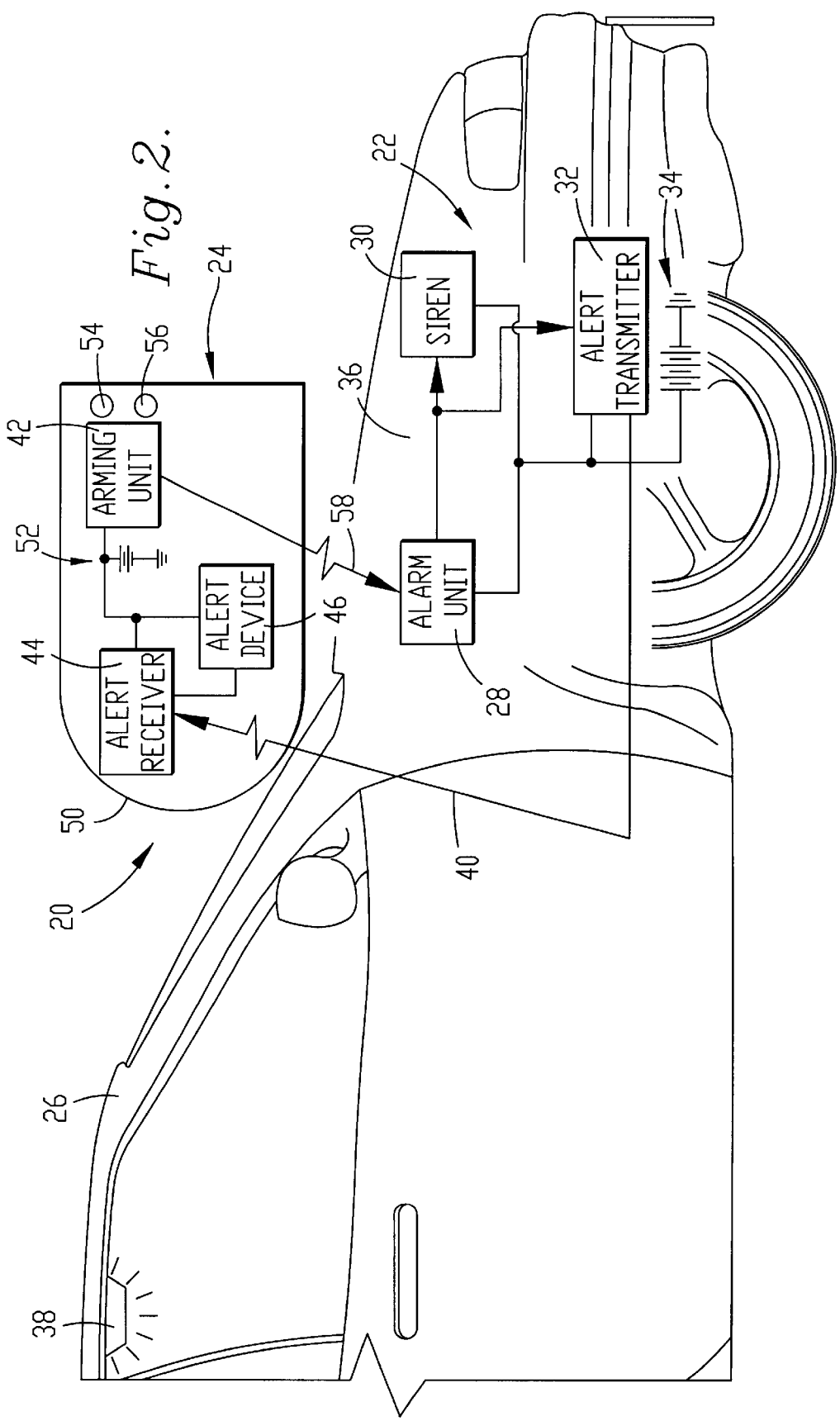
FIG. 2 is a schematic diagram of a vehicle alarm system having an alarm condition remote notification feature according to the present invention.

FIG. 2 illustrates a preferred vehicle alarm system 20 in accordance with the present invention. The alarm system 20 includes a vehicle assembly 22 and a portable, remote assembly 24. The vehicle assembly 22 is preferably installed in a vehicle 26, and the remote assembly 24 is preferably unitary and carried with the vehicle operator or other responsible entity.

The vehicle assembly 22 comprises an on-site assembly including an alarm unit 28, alarm device 30, alert transmitter 32, and at least one alarm power source 34. Though several components are identified simply as a receiver or a transmitter, it is preferred that transceivers are used in place of these components. The components of the on-site assembly are preferably installed on the vehicle in a protected area such as under the vehicle hood 36.

The alarm unit 28 is a substantially conventional unit provided with common vehicle alarm systems. The current alarm unit is capable of determining the occurrence of an alarm condition and is operative to send an alarm signal to the installed alarm device 30 or the add-on alert transmitter 32 as appropriate when an alarm condition occurs. The alarm unit is also provided with an antenna to aid in receiving a wireless arming signal from the remote assembly 24. When a common vehicle alarm systems is not utilized, the alarm unit comprises an appropriate vehicle component such as a dome light 38 or an operatively installed low voltage sensor interfaced with the add on alert transmitter 32.

The alarm device 30 preferably comprises the vehicle horn although a separate siren can also be provided. The alarm device 30 is operatively connected to the alarm unit to receive the alarm signal from the alarm unit, and the alarm device operates to emit an audible alarm upon receipt of the alarm signal. When an existing alarm system is adapted to include the remote signaling feature, the currently installed alarm device 30 can be disconnected from the alarm unit 28 to reduce battery consumption and avoid the noise emitted from the alarm device 30.

The alert transmitter 32 is operatively connected to the alarm unit 28 to receive the alarm signal from the alarm unit. The alert transmitter is preferably a self contained transmitter operable to send a wireless, 900 MHZ alert signal 40 to the remote assembly 24 upon receipt of the alarm signal from the alarm unit. The self-contained alert transmitter includes an antenna, an alert transmitter power source, and a wiring harness for connection to an existing vehicle alarm system.

The alarm power source 34 preferably comprises the vehicle battery. The battery 34 is electrically connected to the alarm unit 28 and the alarm device 30 providing power thereto. Though the alert transmitter 32 preferably has its own power source, it can also be powered by the vehicle battery 34.

Figure 1:
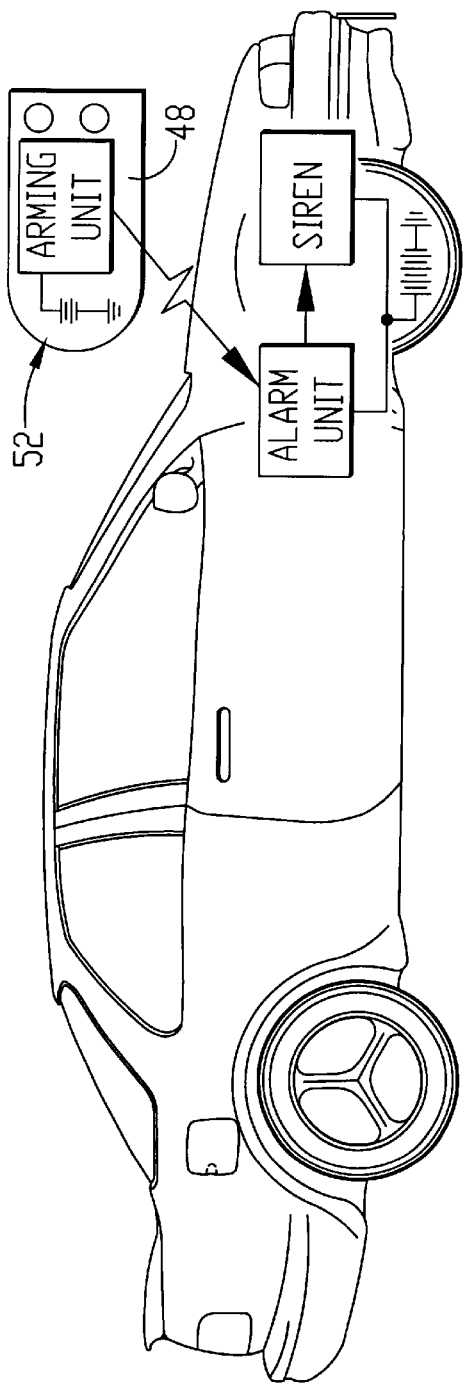
FIG. 1 is a schematic diagram of a prior art vehicle alarm system.

The remote assembly 24, such as a key ring which accompanies the vehicle operator or other responsible entity, includes an arming unit 42, alert receiver 44, and alert device 46. The arming unit 42 is initially held in an arming unit housing 48 (FIG. 1), and the alert receiver 44 and alert device 46 are held in a remote alert housing 50.

The arming unit 42 is electrically connected to and powered by an arming unit power source 52, and the arming unit 42 is controlled by arming unit controls 54,56. The arming unit controls comprise an activation button 54 and a deactivation button 56. The controls 54, 56 are externally accessible for selective activation of the alarm unit by the arming unit. Specifically, the arming unit is operably to send a wireless radio frequency arming signal 58 to the alarm unit 28 to selectively arm and disarm the alarm unit. The arming unit 42, similar to the alarm unit, is a substantially conventional unit provided with common vehicle alarm systems and has an antenna to improve transmission. The arming unit, arming unit power source 52, and controls 54, 56 are preferably removed from the arming unit housing 48 and inserted in the alert housing 50 with the controls 54, 56 still accessible for operation.

The alert receiver 44, which also has an antenna, is operative to receive the 900 MHZ wireless alert signal 40 from the alert transmitter 32, and the alert receiver 44 is also operative to send an alert activation signal to the alert device 46 in response to the wireless alert signal 40. The alert receiver 44 is preferably connected to the arming unit power source 52 and is powered thereby.

The alert device 46 is operatively connected to the alert receiver to receive the alert activation signal therefrom, and upon receipt of the alert activation signal, the alert device is further operable to notify the vehicle operator or responsible entity that an alarm condition has occurred. To notify the operator, the alert device generates a user signal which is detectable by the operator. Preferably, the alert device 46 is provided in the form of either a beeper or a vibrator. As shown in the preferred embodiment of FIG. 2, the alert device, like the alert receiver 44, is preferably powered by the arming unit power source 52. Further, the alert device is operatively connected to the arming unit controls 54, 56 to be selectively activated and deactivated thereby.

The alert housing 50 is preferably larger that the arming unit housing 48, and the alert housing has an opening to receive the arming unit 42 therein. The alert housing 50 and the arming unit 42 are coupled together preferably, so that the arming unit is inserted into the opening of the alert housing 50 with the arming unit controls 54, 56 still externally accessible for use.

Figure 3:
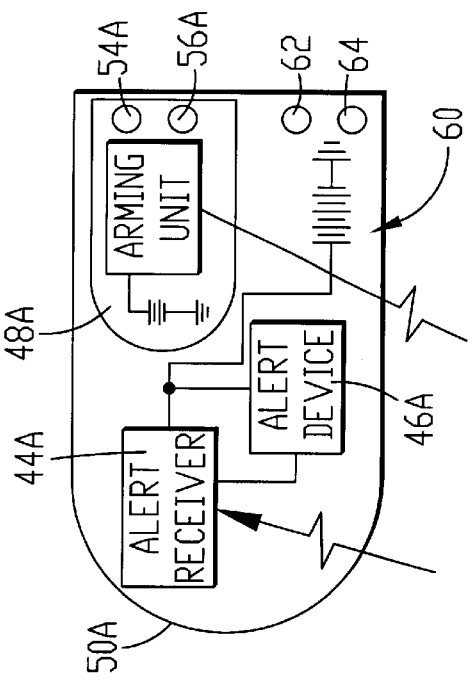
FIG. 3 is a schematic diagram of an alternate embodiment of a unitary, remote assembly used in a vehicle alarm system having the alarm condition remote notification feature according to the present invention.

In the alternate embodiment illustrated in FIG. 3, in which elements similar to those already described have been given the corresponding reference numeral with the distinguishing suffix A added thereto, a separate alert power source 60 is provided in the alert housing 50A. Both the alert device 46A and the alert receiver 44A are powered by the alert power source 60. Additionally, alert controls 62, 64 are provided. A deactivation button 62 operates to deactivate the alert device 46A, and a notification selection button 64 operates to selectively switch the alert device between beeping and vibrating modes. Additionally, other controls, such as door locks and ignition, can be provided in the combined housings. Because the controls and power source are separate, the entire arming unit housing 48A is coupled with the alert housing 50A. Preferably, the arming unit housing 48A is inserted into the alert housing 50A with the arming unit controls 54A, 56A accessible for selective operation.

In operation, the vehicle owner activates the alarm unit 28 by depressing the activation button 54. When the activation button is depressed, the arming unit 42 sends the wireless arming signal to the alarm unit 28 thereby activating the alarm unit. When an alarm condition occurs, such as the dome light 38 turning on, the alarm unit simultaneously sends the alarm signal to the alarm device 30 and the alert transmitter 32. In response to the alarm signal, the alarm device emits an audible alarm, and the alert transmitter sends the wireless alert signal 40 which is received by the alert receiver 44.

Immediately upon receipt of the wireless alert signal by the alert receiver, which is located with the responsible entity, the alert receiver transmits an alert activation signal to the alert device 46 which begins to beep or vibrate. Thus, the present invention operates to notify the responsible entity, even when that entity cannot hear the audible alarm device, that an alarm condition has occurred and that investigation is required.

After notification of the alarm condition, the vehicle owner depresses the deactivation button 56 to shut off the alert device. After the responsible entity returns to the vehicle, the deactivation button 56 is depressed again to shut off the alarm device 30. Alternatively, the deactivation button is also operative to shut off the alarm device 30 from a remote location. In the embodiment of FIG. 3, the deactivation buttons 56, 64 are depressed when appropriate to shutoff the alert device first and then the alarm device. Because the vehicle owner is immediately summoned to the vehicle, there is no chance for the vehicle battery to run down or for an intruder to continue illegal activities without being identified.

It will be appreciated that the present invention can be incorporated as part of the original manufacture. For example, the unit could be incorporated as part of the vehicle during manufacture or incorporated as an integral part of an after-market alarm system.

Figure 4:
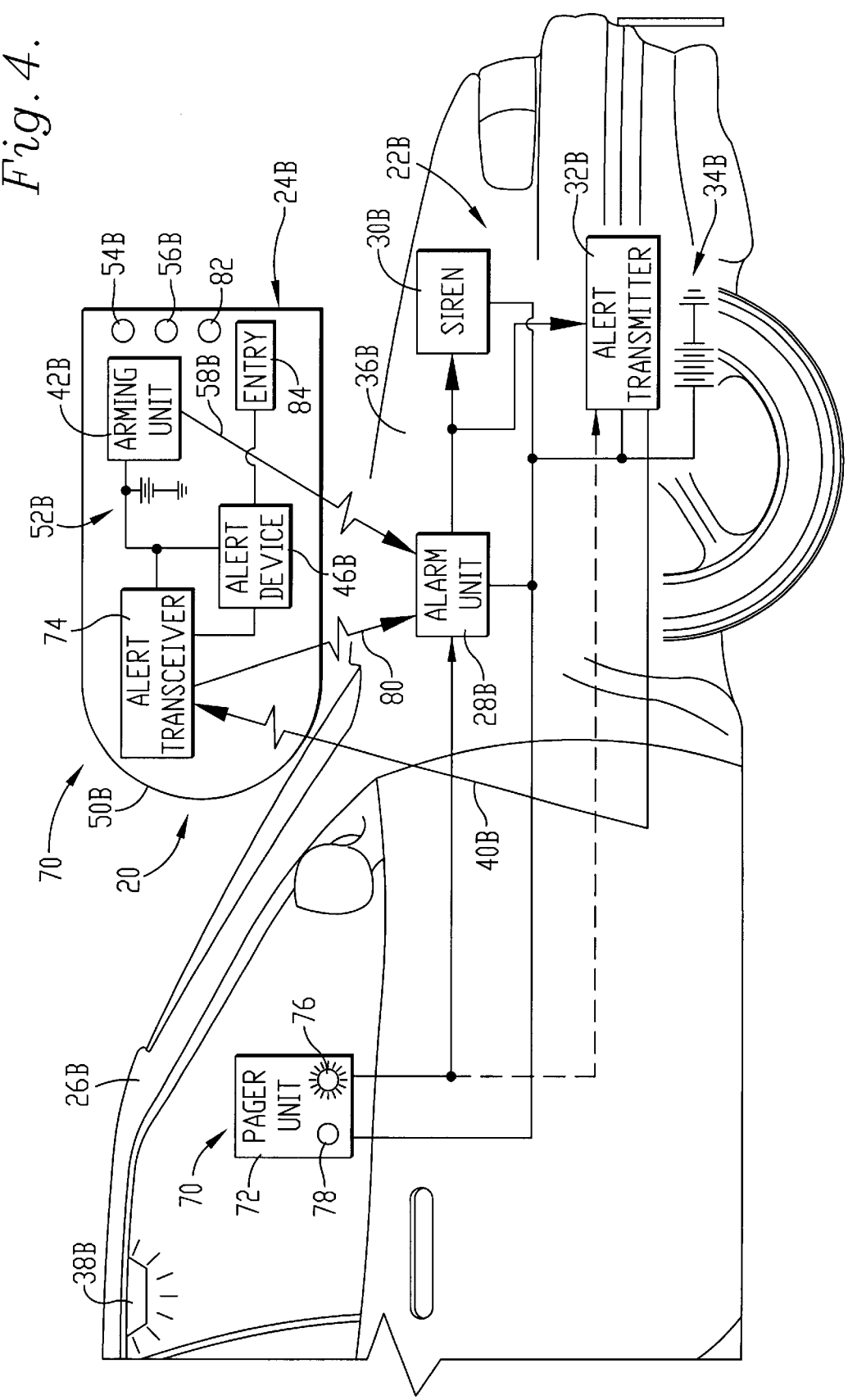
FIG. 4 is a schematic diagram of a pager system according to the present invention in combination with the vehicle alarm system of FIG. 2.

Referring to FIG. 4, in which elements similar to those already described have been given the corresponding reference numeral with the distinguishing suffix B added thereto, a pager system 70 is preferably used in combination with the vehicle alarm system 20. The pager system 70 includes a pager unit 72, a remote alert transceiver 74 mounted in the remote alert housing 50B, and preferably utilizes other components of the alarm system as described below. However, it should be recognized that the required components from the alarm system can be provided separately with the pager system 70. For example, the alert transmitter 32B can be provided in the pager unit.

The pager unit 72 is mounted on the vehicle, preferably in the passenger compartment. The pager unit includes a pager activation indicator 76 and, a pager activation button 78. The activation indicator 76 is a light, preferably an LED, that is visible to the vehicle passengers, and the activation button 78 is accessible to the vehicle passengers. The pager unit 72 can have its own power source or be electrically connected to the vehicle battery 34B, and the pager unit is selectively operable to transmit a pager signal. Preferably, the pager unit 72 is in communication with the alarm unit 28B, and the alarm unit is operable to receive the pager signal. Alternatively, as illustrated by the dashed line, the pager unit is in communication with the alert transmitter 32B, and the alert transmitter is operable to receive the pager signal.

The remote alert transceiver 74 is operable to receive the wireless alert signal 40B from the alert transmitter 32B, and like the remote alert receiver, transmit an alert activation signal to the alert device 46B. The transceiver 74 is also selectively operable to send a 900 MHZ wireless acknowledgment signal 80 to the alarm unit 28B when an acknowledgment button 82 is depressed. If the user does not desire the acknowledgment feature, the transceiver can be replaced with a receiver.

The operation of the alarm system when combined with the pager system is substantially similar to that described above and will only be described here to the extent such operation is influenced by the pager system 70. An individual waiting in the vehicle presses the pager activation button 78, and the pager unit 72 sends the pager signal to the alarm unit 28B. When the activation button is pressed, the pager activation indicator 76 is illuminated to confirm that the pager signal was transmitted. Upon receipt of the pager signal, the alarm unit sends a notification signal to the alert transmitter, and the alert transmitter sends the 900 MHZ wireless alert signal 40B to the remote alert transceiver 74. When the alert signal is received, the remote alert transceiver sends the alert activation signal to the remote alert device 46B which vibrates, beeps, or both beeps and vibrates to notify the user of the page. When the remote individual presses the acknowledgment button 82, the transceiver 74 sends the wireless acknowledgment signal 80 to the alarm unit 28B to inform the pager unit that the wireless alert signal 40B was received by the transceiver 74. The alarm unit then signals the pager unit 72 with a deactivation signal to deactivate the indicator light 76 thereby notifying the individual in the vehicle that the page has been received. Thus, a child can be given the remote pager housing 50B, with or without the alarm system controls and features, and wait inside until a parent driving the vehicle activates the pager by pressing the pager activation button 78. Further, the parent in the vehicle knows when the child has received the page because the indicator light 76 shuts off when the child presses the acknowledgment button 82 on the housing.

Variations in the above operation add additional features to the pager system. Upon receipt of the pager signal, the alarm unit can send both the notification signal to the alert transmitter and the alarm signal to the vehicle alarm device 30B. Alternatively, the pager can be operable to activate the vehicle alarm device if, for example, the pager activation button is pressed twice in succession. This gives an individual in the car the opportunity to activate the vehicle alarm device 30B when desired and without the occurrence of an alarm condition. When an alarm condition occurs, the alarm system notifies the responsible individual as described above. If desired, the acknowledgment signal can also operate to shut off the vehicle alarm device 30B. The pager system 70 can also be used with the embodiment of the housing 50A shown in FIG. 3.

In another embodiment, described with reference to FIG. 4, the alarm system notifies the responsible person that an alarm condition has occurred and provides information to the responsible person about the type of alarm condition. In this embodiment, the alarm unit 28B is able to detect and identify, for example, a person in close proximity to the vehicle, contact with the vehicle body, entry into the vehicle, and vehicle engine start. The alarm unit 28B selects a code corresponding to a detected alarm condition and transmits that code to the alert transmitter 32B. The alert transmitter sends an encoded wireless signal 40B including the selected code to the remote alert transceiver 74. Though a transceiver is preferred, a receiver can be used. The alert transceiver sends the code to the remote alert device 46B which generates a user signal corresponding to the received code.

Preferably, there are a plurality of codes with one code corresponding each detectable alarm condition, and the alert device 46B is operable to generate a plurality of user signals with a unique user signal corresponding to each code. For example, if a pager having a display 84 is utilized, and an individual gains entry into the vehicle, the display would read "entry". If the car is then started, another signal would be sent by the alert transmitter 32B causing the alert device 46B to update the alarm condition to "started."

Thus, this feature of the invention allows the responsible person to make an informed decision about returning to the vehicle. If there is simply a person in close proximity, the responsible person may decide not to return to the vehicle at all, but if there is contact with the vehicle body, the responsible person might return to investigate. If there is an entry or engine start the responsible person should simply call the police. As an additional feature, the responsible person can select which alarm conditions, if any, will activate the vehicle siren 30B.

Those skilled in the art will appreciate that the present invention encompasses many variations in the preferred embodiments described herein. Having thus described those embodiments, the following is claimed as new and desired to be secured by Letters Patent:

We claim:

1. A vehicle alarm and pager system for paging remote individuals and for detecting intruders and notifying vehicle operators of the presence of intruders, the vehicle alarm and pager system comprising:

an alarm unit for installation on a vehicle and being operable to transmit an alarm signal upon occurrence of an alarm condition;

a remote arming unit for accompanying a vehicle operator, and being selectively operable to transmit a wireless arming signal to the alarm unit, and wherein the alarm unit is operable to receive the arming signal and to arm and disarm upon receipt of the arming signal;

an alert transmitter for installation on a vehicle, and the alert transmitter being operable to receive the alarm signal from the alarm unit and being further operable to transmit a wireless alert signal upon receipt of the alarm signal;

a remote alert transceiver for accompanying a vehicle operator, and the remote alert transceiver being operable to receive the wireless alert signal from the alert transmitter and being further operable to transmit an alert activation signal upon receipt of the wireless alert signal and to transmit a wireless acknowledgment signal to alarm the unit, and the alarm unit being operable to receive the wireless acknowledgment signal;

an alarm device for installation on a vehicle and being operable to receive the alarm signal from the alarm unit, and being further operable to emit an alarm upon receipt of the alarm signal, and wherein the alarm unit is operable to deactivate the alarm device upon receipt of the wireless acknowledgment signal from the remote alert transceiver;

a remote alert device for accompanying a vehicle operator, and the remote alert device being operable to receive the alert activation signal from the remote alert transceiver and being further operable to generate a user signal to notify the vehicle operator of the alarm condition upon receipt of the alert activation signal; and a remote housing holding the remote arming unit, remote alert transceiver, and remote alert device.

2. The vehicle alarm system according to claim 1 further comprising a pager unit for being mounted on a vehicle and being operative to transmit a pager signal to the alarm unit, and wherein the alarm unit is operative to receive the pager signal and transmit a notification signal to the alert transmitter upon receipt of the pager signal whereby the remote alert device is activated.

3. The vehicle alarm system according to claim 2 further comprising a vehicle battery electrically connected to the alarm unit, the alarm device, the alert transmitter, and the pager unit for powering the alarm unit, the alarm device, the alert transmitter, and the pager unit.

4. The vehicle alarm system according to claim 2 wherein the pager unit includes a pager activation button.

5. The vehicle alarm system according to claim 2 wherein the pager unit includes a pager activation indicator operative to indicate that the pager signal has been transmitted.

6. The vehicle alarm system according to claim 5, wherein the alarm unit is operable to transmit a deactivation signal to the pager unit to deactivate the pager activation indicator upon receipt of the acknowledgment signal from the remote alert transceiver.

7. The vehicle alarm system according to claim 5, wherein the pager activation indicator comprises a light.

8. The vehicle alarm system of claim 2, wherein the alarm unit transmits both the alarm signal and the notification signal upon receipt of the pager signal.

9. The vehicle alarm system of claim 2, wherein the pager unit is selectively operated by an individual from inside the vehicle.

10. The vehicle alarm system according to claim 1, wherein the alert transmitter is operable to transmit an encoded wireless alert signal including a selected one of a plurality of codes, the remote alert receiver is operable to receive the encoded wireless alert signal, and the remote alert device is operable to generate a plurality of user signals corresponding to the codes thereby notifying the remote individual of the selected code transmitted in the encoded wireless alert signal.

11. The vehicle alarm system of claim 1, wherein the remote alert transceiver comprises a 900 MHz remote alert transceiver, and the remote alert device comprises a selected one of a beeper and a vibrator.

12. The vehicle alarm system of claim 1, wherein the remote alert device includes a display.

13. The vehicle alarm system of claim 1, wherein the alarm unit is operable to detect and identify a plurality of different alarm conditions, select a code corresponding to an existing alarm condition, and transmit the selected code to the alert transmitter.

14. The vehicle alarm system of claim 13, wherein the alarm unit and alert transmitter are operable to update the existing alarm condition.

* * * * *